(No Model.) 4 Sheets—Sheet 1.
H. J. KELLY.
REFRIGERATOR MEAT WAGON.

No. 590,891. Patented Sept. 28, 1897.

WITNESSES:

INVENTOR
H. J. Kelly.
BY
ATTORNEYS.

(No Model.) 4 Sheets—Sheet 2.

H. J. KELLY.
REFRIGERATOR MEAT WAGON.

No. 590,891. Patented Sept. 28, 1897.

WITNESSES:

INVENTOR
H. J. Kelly.
BY
ATTORNEYS.

(No Model.)  4 Sheets—Sheet 3.

H. J. KELLY.
REFRIGERATOR MEAT WAGON.

No. 590,891.  Patented Sept. 28, 1897.

WITNESSES:

INVENTOR
H. J. Kelly.
BY
ATTORNEYS.

(No Model.) 4 Sheets—Sheet 4.

H. J. KELLY.
REFRIGERATOR MEAT WAGON.

No. 590,891. Patented Sept. 28, 1897.

WITNESSES:
Henry T. Hirsch.
S. R. Ferguson

INVENTOR
H. J. Kelly
BY
[signature]
ATTORNEYS.

UNITED STATES PATENT OFFICE.

HENRY J. KELLY, OF CARNEGIE, PENNSYLVANIA.

REFRIGERATOR MEAT-WAGON.

SPECIFICATION forming part of Letters Patent No. 590,891, dated September 28, 1897.

Application filed April 7, 1896. Serial No. 586,509. (No model.)

*To all whom it may concern:*

Be it known that I, HENRY J. KELLY, of Carnegie, in the county of Allegheny and State of Pennsylvania, have invented a new and Improved Refrigerator Meat-Wagon, of which the following is a full, clear, and exact description.

This invention relates to wagons for the transportation of meat, in selling the same from house to house; and the object is to provide a wagon wherein a circulation of cold air may be maintained while the wagon is moving, and thus preserve the meat, and, further, to so construct the wagon that the meat contained therein may be easily reached when desired for sale.

I will describe a wagon embodying my invention and then point out the novel features in the appended claims.

Reference is to be had to the accompanying drawings, forming a part of this specification, in which similar characters of reference indicate corresponding parts in all the views.

Figure 1:
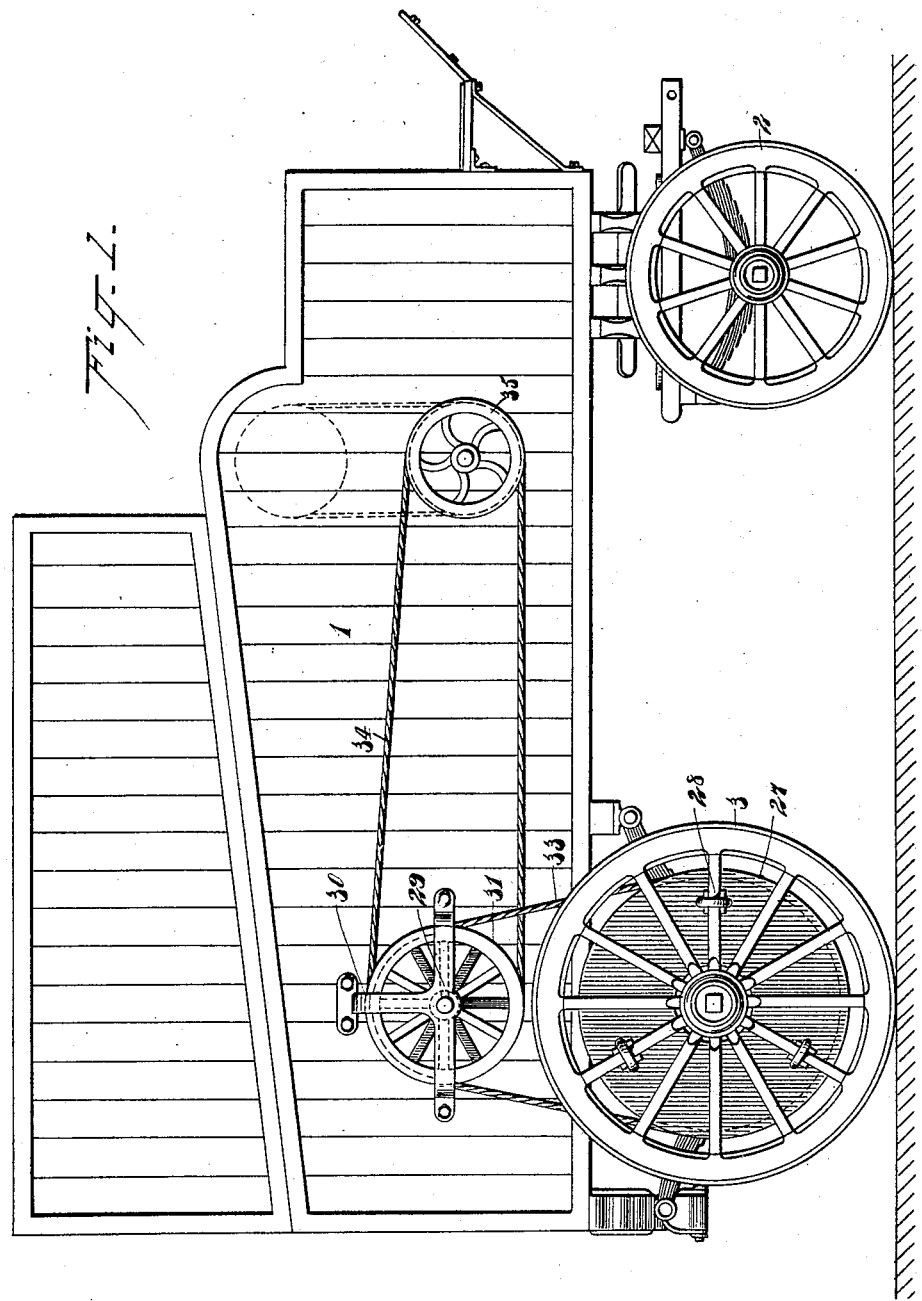
Figure 2:
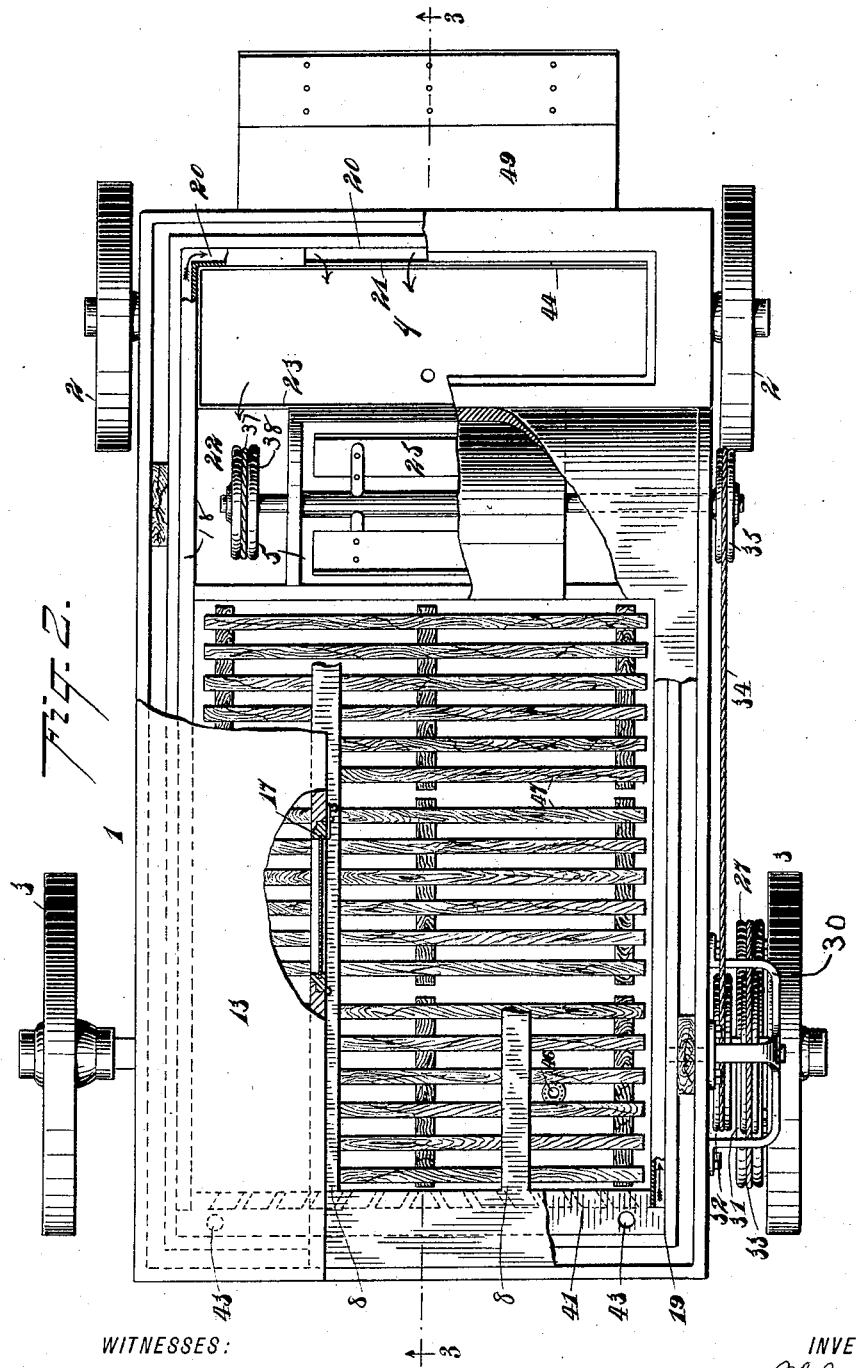
Figure 3:
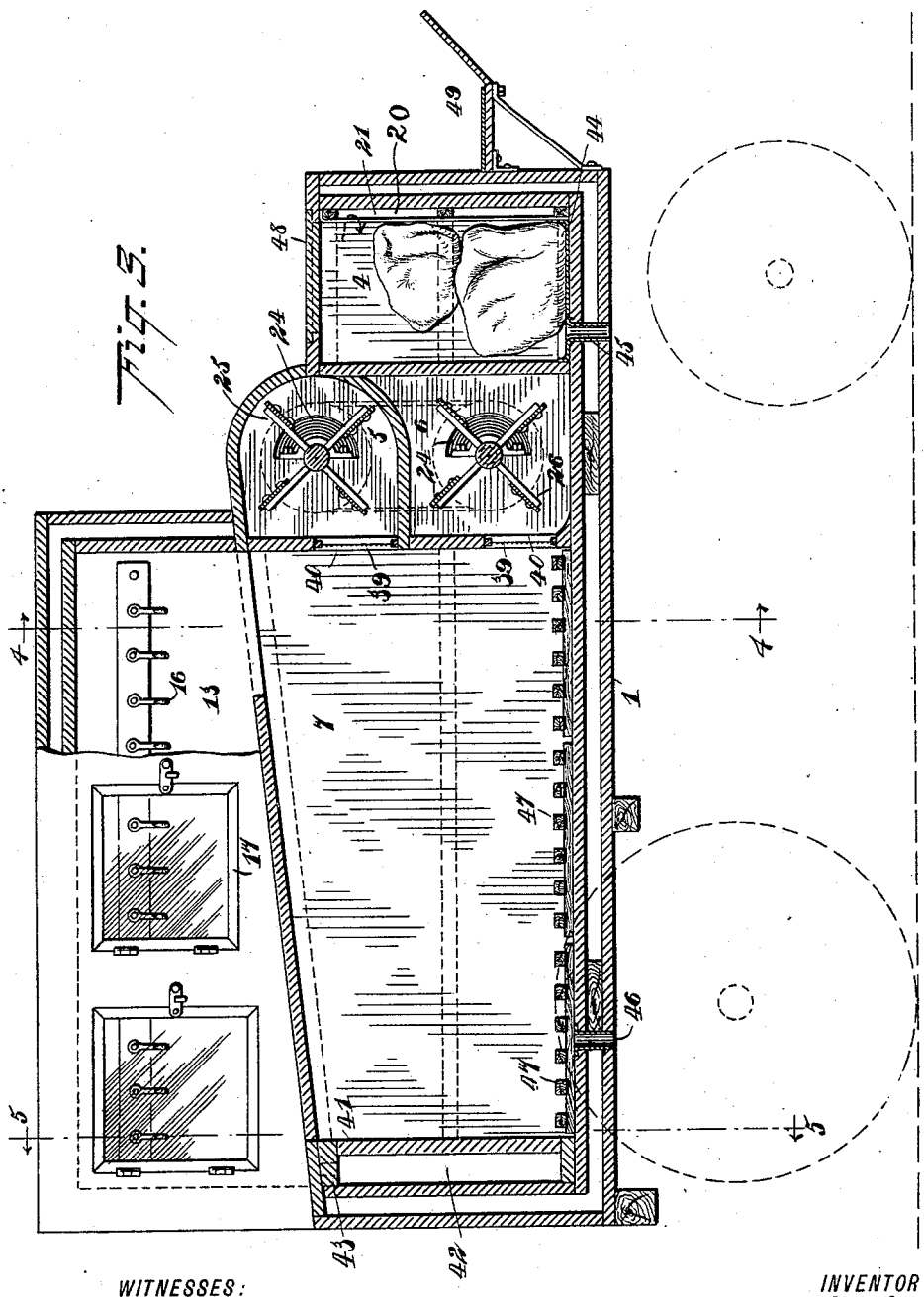
Figure 4:
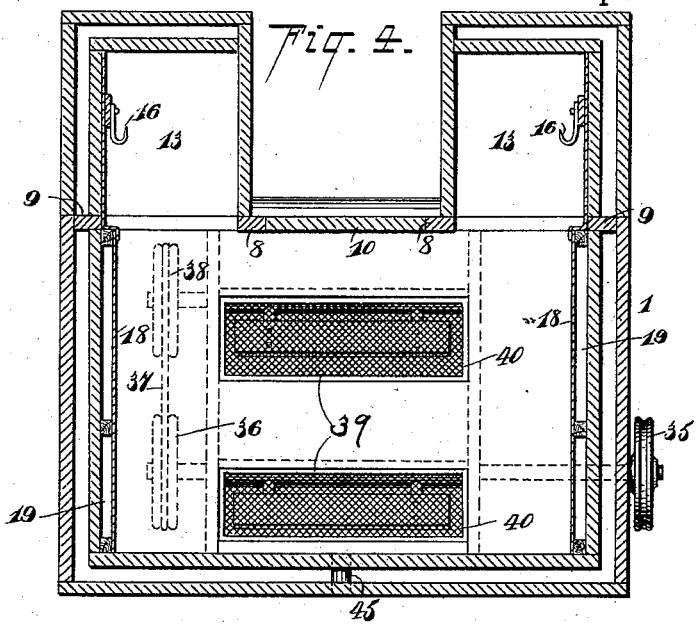
Figure 5:
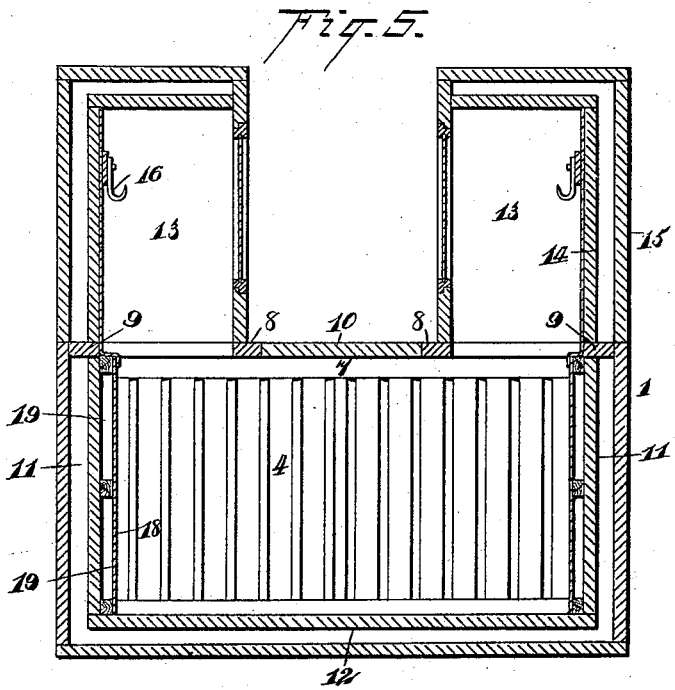

Figure 1 is a side elevation of a wagon embodying my invention. Fig. 2 is a partial plan and a partial section thereof. Fig. 3 is a section on the line 3 3 of Fig. 2. Fig. 4 is a section on the line 4 4 of Fig. 3, and Fig. 5 is a section on the line 5 5 of Fig. 3.

The wagon comprises a body portion 1, mounted on front wheels 2 and rear wheels 3. This body portion 1 is of box-like construction and comprises an ice-chest 4 in its front end, air-chambers 5 and 6 rearward of the ice-chest, and a large chamber 7 for the accommodation of large pieces or quarters of meat. The top of the box is inclined downward from the rear side of the air-chamber 5 to the rear end of the body portion, and this top portion is provided with longitudinal strips 8 and side longitudinal strips 9. A removable cover 10 may be placed between the strips 8, and when this cover is removed it is evident that access may be gained to the chamber 7 of the body portion. The chamber 7 comprises side walls 11, spaced from the inner sides of the body portion, and a bottom 12, spaced from the bottom of the body portion. Thus it will be seen that a still-air chamber will be formed around the chamber 7 and also around the air-chambers and ice-chest, which will to a great extent prevent the penetration of heat from the outer side.

Extended longitudinally of the body portion and supported on adjacent longitudinal strips 8 9 are meat-chests 13, comprising inner walls 14 and outer walls 15, having a space between them forming a chamber for still air. Secured to the inner sides of the inner walls 14 are hooks 16, upon which small pieces or portions of meat may be suspended, and the inner fronts of these meat-chests are provided with hinged doors 17, that may have rabbeted engagement with the walls of the openings through the fronts similar to an ordinary refrigerator-door, and, if desired, these doors 17 may be provided with glass panels.

The chamber 7 has an interior wall 18, which may consist of zinc or other suitable material, and this interior wall 18 is spaced from the outer wall of the chamber to form air-passages 19, which communicate with an air-passage 20 around the ice-chest 4, and this air-passage 20 communicates with the interior of the ice-chest 4 through an opening 21 in its rear wall.

Between the end walls of the air-chambers 5 and 6 and the wall 18 are air-spaces 22, which communicate with the ice-chest through openings 23, and the air-chambers 5 and 6 have openings 24 through their end walls communicating with the air-spaces 22. Within the air-chamber 5 is a rotary fan 25, and a similar rotary fan 26 is located in the air-chamber 6, and rotary motion is imparted to these fans to promote a continuous current of air by means of connections with one of the wheels of the wagon.

As here shown, one of the rear wheels 3 of the wagon has attached to its inner side a band-wheel 27. This band-wheel 27 has a central opening to engage over the hub of the wheel, and it is secured to the wheel by means of clips 28. A shaft 29 has bearings at one end in a frame 30, secured to the side of the body portion 1, and at its other end in a boxing secured to the side of said body portion. On the shaft 29 is mounted a pulley 31 and a pulley 32. The pulley 32 is rigidly attached to the shaft, but the pulley 31 is so mounted as to rotate with the shaft, but to move longitudinally thereof, so as to compensate or to adjust itself to a lateral movement of the body portion with relation to the wheels, and for this purpose I may provide a feather-and-groove connection between the shaft 29 and pulley 31. A band 33 extends around the wheel 27 and also around the pulley 31, and preferably this band 33 is of flexible material—such, for instance, as rubber—so that when the body portion moves upward and downward with relation to the rear wheels or their axle there will be no danger of the breaking of the band 33. It is obvious, however, that other means may be provided to secure a relative vertical movement between the parts. From the pulley 32 a band 34 extends to a connection with a pulley 35, mounted on the outwardly-extended shaft of the lower fan 26. The inner end of this shaft is provided with a pulley 36, having a band connection 37 with a pulley 38 on the shaft of the upper fan 25. It will be seen by this construction that when the wagon is in motion the fans will be operated to draw the cold air from the ice-chest and force it into the chamber 7. The openings 39 through the inner walls of the chambers 5 and 6 provide communication between said chambers and the chambers 7. These openings are provided with screens 40, allowing the free passage of air. The rear end of the chamber 7 is provided with a removable lattice 41, through the spaces of which air may be forced to the air-space 42 rearward of said lattice. This air-space 42 communicates with the air-passages 19, so that the air is forced from this chamber 7 through the passages 19 and into the chamber 4. From the chamber 4 the air is again forced into the chamber 7 by means of fans 25 26. By these means a continual circulation of air is kept up through the chamber 7, passages 42 and 19, and chambers 4, 5, and 6.

The ice-chest 4 may be provided with a metal tray 44, and preferably an outlet-spout 45 for the passage of water may be extended through the bottom of the tray and through the bottom of the ice-chest and body portion of the wagon. The bottom of the chamber 7 may be provided with outlets 46 for the passage of water used in washing the walls and bottom of said chamber, and when not desired to use them as discharges for water these outlets may be closed by a suitable plug.

Removably supported on the bottom of the chamber 7 are racks 47, which will support the meat placed thereon out of contact with the zinc bottom of the chamber. The top of the ice-chest 4 has an opening provided with a removable cover 48, and the top of said ice-chest may be employed as a seat for the driver, and connected to the front of said ice-chest is a foot-board 49, upon which may be placed a chopping or meat block, if desired.

It will be seen that a wagon embodying my improvements will be very compact and not top heavy, as is often the case with wagons employed in the peddling of meat. As there is a constant circulation of air in the manner described, it is obvious that the wagon will be kept cool and dry. If desired, the wagon may be provided with a canvas or similar cover.

Having thus described my invention, I claim as new and desire to secure by Letters Patent—

1. A refrigerator-wagon, comprising a body portion having a meat-chamber, meat-chests supported on top of the body portion, doors for openings in the inner fronts of said meat-chests, upper and lower air-chambers forward of the meat-chamber and communicating therewith, and an ice-chest forward of the air-chambers and communicating therewith and also having air-passages communicating with air-passages at the sides of the meat-chamber, substantially as specified.

2. A refrigerator-wagon, comprising a body portion having an ice-chest and rotary fans, a band-wheel secured to one of the wheels of the wagon, a pulley mounted on a shaft supported on the body portion and adapted to rotate with said shaft but to move longitudinally thereof, a band connection between the band-wheel on the wagon-wheel and said pulley, another pulley on said shaft, a pulley on the extended shaft of one of the fans, a band connection between said last two named pulleys, and a band connection between the two fans, substantially as specified.

3. A refrigerator-wagon, comprising a meat-chamber, an ice-chest located in the front portion of the wagon-body, air-chambers also located in the front portion of the wagon-body, air-circulating fans in said air-chambers, pulleys mounted on a shaft supported by the body portion of the wagon and operated by a band connection with a band-wheel on one of the wheels of the wagon, means for allowing a vertical movement of said pulleys relatively to the band-wheel, and a connection between one of said pulleys and the pulley on the extended shaft of one of the fans, substantially as specified.

4. A refrigerator-wagon, comprising a body portion open at its top and having a meat-chamber, the outer walls of which are spaced from the sides of the wagon-body, a lining for said chamber spaced from the outer wall of the chamber to form air-passages, a lattice in the rear portion of the chamber having an air-space rearward of it communicating with said air-passages, an ice-chest, circulating-fans for forcing air through the meat-chamber and through the air-passages, strips secured longitudinally on the upper side of the body portion, meat-chests secured on said strips at opposite sides of the body portion and having a space between them and door-closed openings, a cover for the opening in the top of the meat-chamber, and means for imparting rotary motion to the fans, substantially as specified.

5. A refrigerator-wagon having a body portion provided with a provision-chest located at one end of the body portion, an ice-chest located at the opposite end of the body portion, an air-chamber interposed between the ice-chest and provision-chest, the said chests and chamber running entirely across the body portion, and the air-chamber being in communication with the ice and provision chests, a fan located in the air-chamber and forcing the air from the ice-chest through the air-chamber and into the provision-chest, two auxiliary provision-chests, the bottoms of which open into the top of the main provision-chest, the auxiliary chests being superposed on the main chest and having a space between them, and doors at the inner sides of the auxiliary chests, the doors opening into the space between said chests, substantially as described.

HENRY J. KELLY.

Witnesses:
F. P. RENO,
L. PACE.